United States Patent
Bossaer

[15] 3,661,404
[45] May 9, 1972

[54] BICYCLE

[72] Inventor: Camille M. Bossaer, Baron Ruzettelaan 265, Saint Michiels, Belgium

[22] Filed: May 11, 1970

[21] Appl. No.: 36,369

[30] Foreign Application Priority Data

May 13, 1969 Belgium ..............................732.960
Mar. 24, 1970 Belgium ..............................747.850

[52] U.S. Cl. ............................................280/255, 280/258
[51] Int. Cl. .......................................................B62m 1/04
[58] Field of Search ..................280/255, 256, 257, 258, 252, 280/246, 247, 248

[56] References Cited

UNITED STATES PATENTS

| | | | |
|---|---|---|---|
| 849,342 | 4/1907 | Swinbank | 280/255 X |
| 584,200 | 6/1897 | Wheatley | 280/255 |
| 670,715 | 3/1901 | Mahana et al. | 280/252 X |
| 2,707,112 | 4/1955 | Ludwigson et al. | 280/252 X |

FOREIGN PATENTS OR APPLICATIONS 622,335 6/1961 Italy ...................................280/255

Primary Examiner—Kenneth H. Betts
Attorney—Stevens, Davis, Miller & Mosher

[57] ABSTRACT

A bicycle with alternating-motion pedals the movement of which is converted by particular chain means into a rotating motion which is applied to the driving wheel of the bicycle.

2 Claims, 3 Drawing Figures

3,661,404

BICYCLE

This invention relates to a bicycle which comprises two pedals mounted on the free ends of two control levers which are arranged on either side of the frame and which each swing about a substantially horizontal position, on a shaft attached to the rear bicycle fork in parallel relationship with and adjacent to the driving wheel axle, each lever being hung from the one free end of a flexible connecting member cooperating with two wheels mounted on a shaft arranged on the bicycle frame above the control levers, said shaft bearing a pinion driving the sprocket-wheel of the bicycle driving wheel, reversing means being provided to allow said flexible member to cooperate with both said wheels.

The bicycles of said type which have already been designed have various serious drawbacks. Indeed, in such bicycles the drive comprises cables or belts which soon undergo a permanent stretching and they cause the operation of said drive to become very hazardous.

Moreover, said drive also converts the alternating motion of the pedals into a continuous movement of the pinion driving the sprocket-wheel. Complex, delicate and costly devices which comprise ratchet wheels, reversing pinions, gear trains, etc. increase substantially the manufacturing cost of said bicycles and may cause serious failures.

The invention has for an object to obviate said drawbacks and to provide a bicycle of the above-described type with a manufacturing cost no greater than the cost of the usual bicycles without requiring complex mechanisms.

For this purpose, according to the invention, said flexible member is comprised of a chain, of the link-chain type, each end of which is attached to one control lever, both said wheels having free-wheeling pinions with which the chain cooperates and which are mounted on said shaft. The shaft is arranged on the bicycle frame above the control levers in such a way that when a control lever is driven downwards it pulls the chain. The chain is divided in two runs, an active run and a passive run and by means of at least one reversing gear which is idly mounted on a shaft and located between both free-wheeling pinions, said runs passing along the same direction over both pinions, said chain rotates both free-wheeling pinions along opposite directions. The other control lever is driven by the chain passive run upwards, the active run movement causing rotating of the shaft bearing the pinions during the lowering of that control lever which cooperates with said active run, the pinion rotating direction is reversed when that control lever which is connected to the passive run has reached the highest position thereof and begins to go down to drive the shaft along that same direction it was driven along by the lowering of the other control lever. The pinion driving the bicycle driving wheel sprocket-wheel is either a pinion made fast to the shaft bearing both said free-wheeling pinions, or a free-wheeling pinion which is so arranged as to be positively-driven by the shaft rotating.

In one embodiment, the free-wheeling pinions are mounted on the shaft thereof so as to be idle relative thereto when they are driven by the chain along a direction opposite to the direction of the bicycle wheels when said bicycle is moving forward.

In an advantageous embodiment, said reversing gear is mounted on a shaft the axis of which is at right angle to the axis of the shaft which bears the free-wheeling pinions, that portion of the chain which is to cooperate with the reversing gear being arranged with the axis of the rollers thereof at right angle to the axis of the rollers of those chain portions which cooperate with each said free-wheeling pinion, two parts having each two rollers with the axis thereof at right angle being provided to join the chain portions.

In a particularly advantageous embodiment of the invention, the diameter of the reversing gear is substantially equal to the spacing between the teeth of said free-wheeling pinions, the axis of that shaft bearing said reversing gear being located in a plane at right angle to the axis of the shaft which bears said free-wheeling pinions and which lies about midway between said pinions.

Other details and features of the invention will be apparent from the description given below by way of non limitative example and with reference to the accompanying drawings, in which.

In the various figures, the same reference numerals pertain to similar elements.

Figure 1:
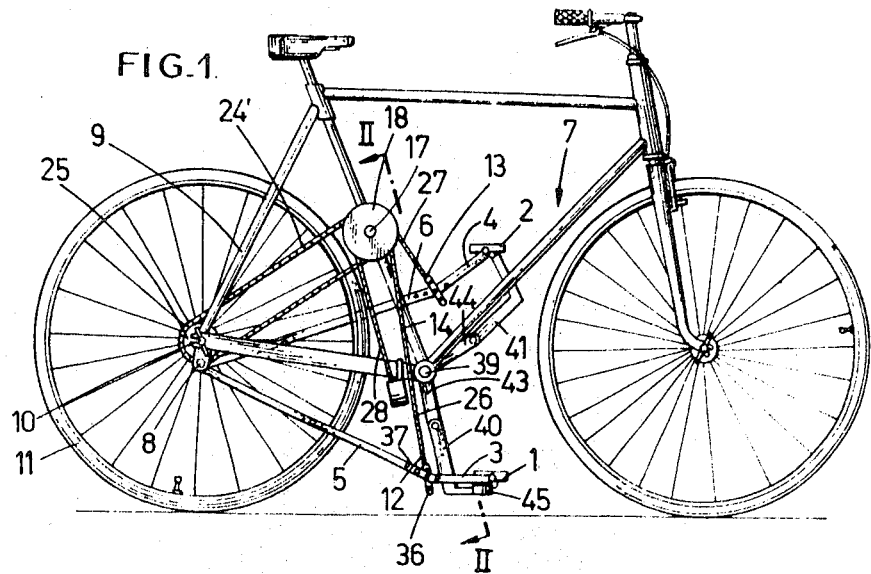
FIG. 1 is a diagrammatic elevation view of a bicycle according to the invention.
Figure 2:
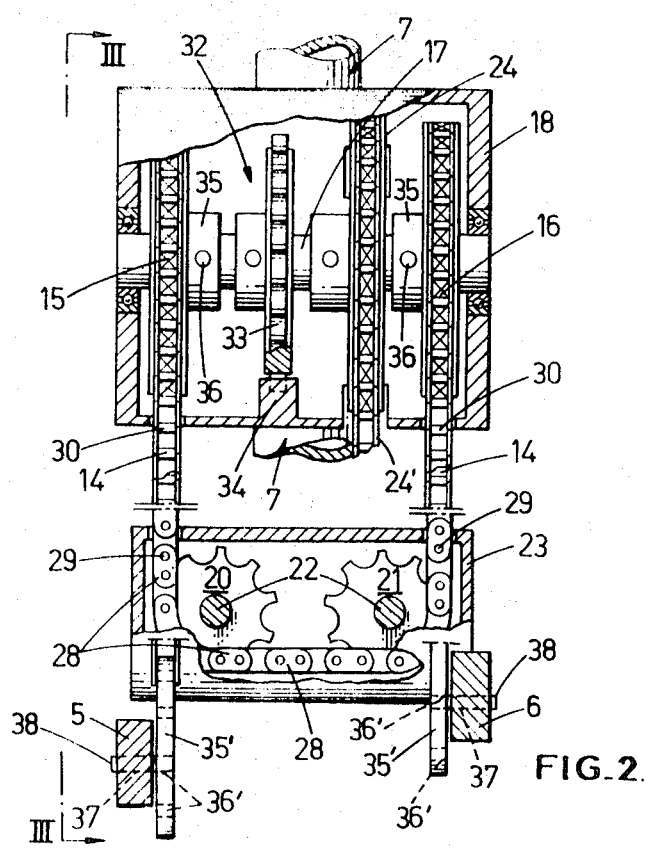
FIG. 2 is a diagrammatic view on a larger scale than FIG. 1, with parts in section taken along line II—II of FIG. 1, which shows the drive of said bicycle.
Figure 3:
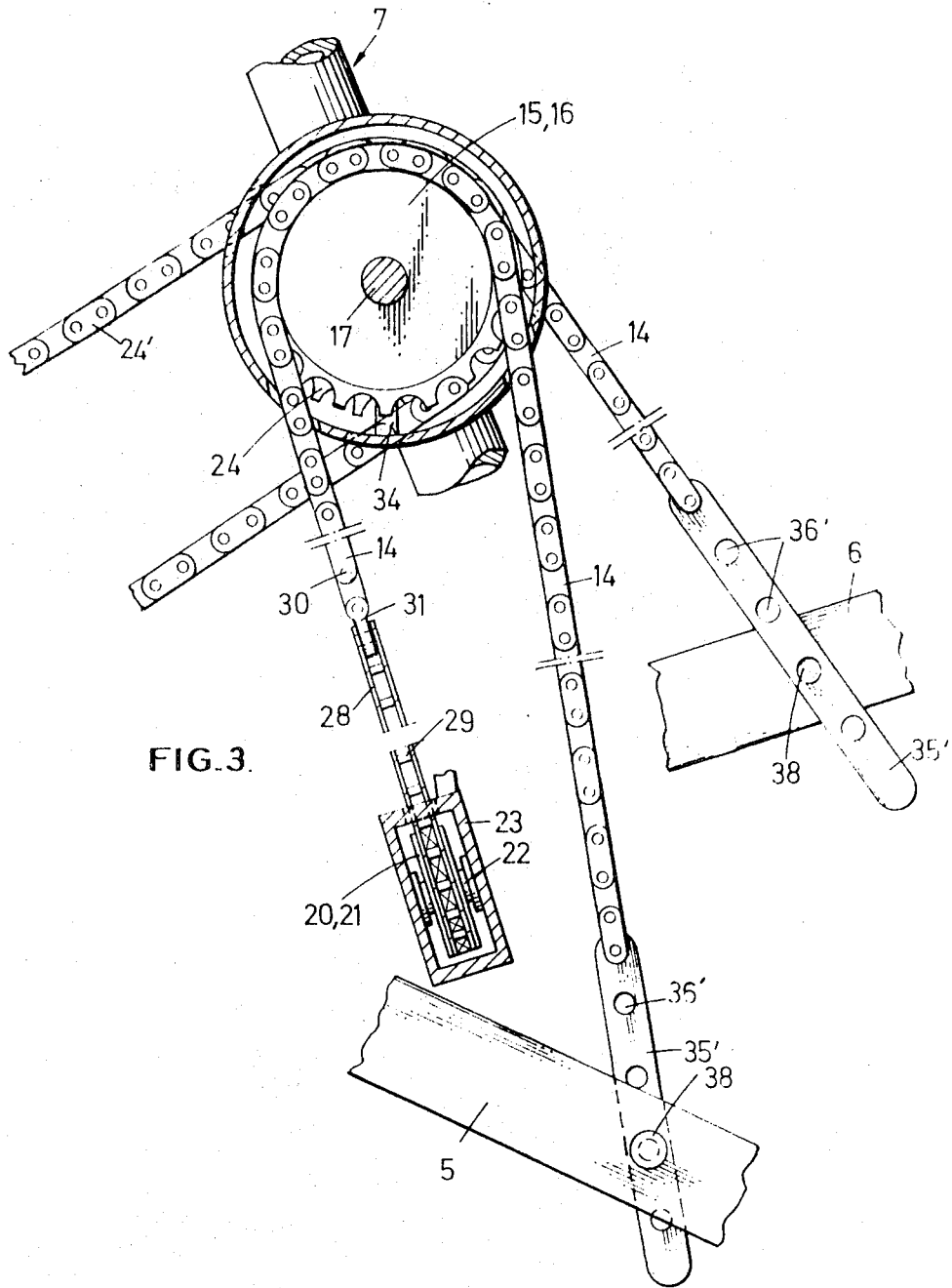
FIG. 3 is a view partly in section along line III—III of FIG. 2, of the bicycle drive.

The bicycle shown in the drawings and with more particular reference to FIG. 1, has two pedals 1 and 2 mounted on the free ends 3 and 4 of two control levers 5 and 6 which are arranged on either side of the bicycle frame 7. Each lever 5, 6 swings about a substantially horizontal position and adjacent the end thereof opposite to the pedals, on a shaft 8 which is attached to the rear fork 9 of the bicycle, in parallel relationship with and adjacent to the axle 10 of the driving wheel 11, both shafts 8 being attached to the fork 9 in end to end relationship. The levers 5 and 6 are hung from the ends 12 and 13 of a link-type chain 14, which cooperates with two free-wheeling pinions 15 and 16 which are mounted on a shaft 17 which is so arranged as to be rotatable about the axis thereof inside a housing 18. The housing is provided with openings for the chains 14 and 24′ and which is attached to the frame 7 of the bicycle above the control levers 5 and 6. A reversing wheel, or as shown in FIGS. 2 and 3, two reversing gears for the chain are provided on the bicycle, each such gear being mounted idle on a fixed shaft 22, said shafts 22 being mounted in turn in a housing 23 which is provided with openings for the chain 14 and which is attached to the frame 7 of the bicycle. Said shaft 17 also bears a pinion which drives through a chain 24′, the sprocket-wheel 25 of the bicycle driving wheel 11, said pinion 24 being either a pinion made fast to the shaft 17, or a free-wheeling pinion which is so arranged as to be positively driven by the rotating of the shaft 17. The pinions 15 and 16 are so mounted on the shaft 17 as to be idle relative thereto when said pinions are driven by the chain 14 along a direction opposite to the direction of the bicycle wheels as said bicycle moves forward, in such a way that when a control lever is driven downwards it pulls the chain 14. This chain is divided in two runs, an active run 26 and a passive run 27, and by means of the reversing gears 20 and 21, said runs pass along the same direction over said pinions 15 and 16, the chain causing said pinions 15 and 16 to rotate along opposite directions, the other control lever being driven upwards by the chain passive run. The active run movement causes rotation of shaft 17 during the lowering of that control lever which corresponds to said active run, the rotating direction of the pinions 15 and 16 being reversed when that control lever which is connected to the passive run reaches the highest position thereof and begins to go down so as to drive said shaft 17 along the same direction it was driven along during the lowering of the other control lever. The reversing gears 20 and 21 are mounted on shafts 22 the axis of which are at right angle to the axis of said shaft 17. That portion 28 of the chain 14 which is to cooperate with the wheels 20 and 21 is arranged with the axis of the rollers 29 thereof at right angle to the axis of the rollers 30 of those chain portions which cooperate with the free-wheeling gears 15 and 16, two parts 31 having each two rollers with the axis thereof at right angle, being provided to join together the chain portions. The reversing gears 20 and 21 are so arranged that the spacing between the farthest away teeth thereof is substantially equal to the spacing between the teeth of the free-wheeling pinions 15 and 16, the shafts 22 of said gears 20 and 21 being located between said pinions 15 and 16 in such a way that those chain portions which lie between the pinions 15 and 16 and the gears 20 and 21 will be substantially in parallel relationship and cross the axis of said shaft 17 along a direction substantially at right angle thereto. The pinion 24 is arranged between said pinions 15 and 16 together with a device 32 for preventing the bicycle moving backwards and so as to avoid any release of the chain 14 form the pinions and gears it cooperates with. The device 32 is comprised of a freewheeling pinion 33 which is mounted on said shaft 17, said pinion cooperating with a projection 34 on the housing 18 which is so located that it enters between two teeth of said pinion 33. Said pinion 33 is so mounted on the shaft 17 that it is free relative thereto when said shaft 17 is rotated by either one of both pinions 15 and 16, while said pinion 33 is locked to said shaft 17 and prevents same from rotating by cooperating with the housing projection 34 when said shaft 17 tries to rotate along the opposite direction. The pinions 15 and 16 are advantageously mounted on the shaft 17 by means of sleeves 35 made fast by cotters or pins 36, which are directed towards one another. The chain 14 is provided at each end thereof with a connecting part 35' for the joining to the control levers 5 and 6. Said part 35' has a series of holes 36' which lie in line and are spaced regularly among them, while the levers 5 and 6 are also provided with holes 37 which lie in line and are spaced regularly among them, in such a way that it is possible to change the place where the chain 14 is joined to the levers 5 and 6 by moving the parts 35' relative to the levers and by connecting same in the selected position by means of removable studs 38. The levers 5 and 6 are mounted on the crank-gear shaft 39 through rods 40 and 41 which cooperate with corresponding cranks 43 and 44 which swing freely on the shaft 39. Each such rod bears advantageously a side lug 45 which when the corresponding lever is in the lowest position thereof, engages said lever and acts as a stop in such a way that the weight of the cyclist as he mounts his bicycle will be supported by the crank and not by the chain 14.

It must be understood that the invention is in no way limited to the above embodiments and that many changes may be brought therein without departing from the scope of the invention as defined by the appended claims.

It would notably be possible to substitute to the gears 20 and 21, a single gear wheel the diameter of which would substantially the same as the spacing between the teeth of said pinions 15 and 16, the axis of that shaft which bears said gear lying in a plane at right angle to the axis of the shaft 17 and which is located about midway between the pinions 15 and 16.

I claim:

1. A bicycle comprising two pedals mounted on the free ends of two control levers arranged on either side of a frame, each lever pivoting about a substantially horizontal first shaft attached to the rear bicycle fork in parallel relationship with and adjacent to the driving wheel axle, each lever being hung from one free end of a drive chain cooperating with two free-wheeling pinions mounted on a second shaft on the bicycle frame above the control levers, said second shaft carrying a pinion driving the sprocket-wheel of the bicycle driving wheel, reversing means to allow said chain to cooperate with both said free-wheeling pinions, each end of said chain being attached to one control lever and being divided in two runs, an active run and a passive run, by means of at least one reversing gear which is idly mounted on a shaft and located between the two free-wheeling pinions, said runs passing in the same direction over both pinions, said free-wheeling pinions being mounted on said second shaft in such a way that when a control lever is driven downwards and pulls the chain, said chain rotates both free-wheeling pinions in opposite directions and the other control lever is driven upwardly by the chain passive run, the active run movement causing rotation of the second shaft during the lowering of the control lever which cooperates with the active run, the pinion rotating direction being reversed when the control lever which is connected to the passive run has reached the highest position thereof and begins to go down to drive the second shaft along that same direction it was driven along by the lowering of the other control lever, the pinion driving the bicycle driving wheel sprocket-wheel being driven by the second shaft rotation, means to prevent the bicycle moving backwards, said means comprising a free-wheeling pinion mounted on the second shaft, said pinion cooperating with a projection on said housing so as to enter between two teeth of said pinion, said pinion being so mounted on said second shaft as to be free relative thereto when said shaft is driven by either of said free-wheeling pinions and to be locked to said shaft and to prevent rotating thereof by cooperating with said housing projection when said shaft tries to rotate in the opposite direction.

2. A bicycle comprising two pedals mounted on the free ends of two control levers arranged on either side of a frame, each lever pivoting about a substantially horizontal first shaft attached to the rear bicycle fork in parallel relationship with and adjacent to the driving wheel axle, each lever being hung from one free end of a drive chain cooperating with two free-wheeling pinions mounted on a second shaft on the bicycle frame above the control levers, said second shaft carrying a pinion driving the sprocket-wheel of the bicycle driving wheel, reversing means to allow said chain to cooperate with both said free-wheeling pinions, each end of said chain being attached to one control lever and being divided in two runs, an active run and a passive run, by means of at least one reversing gear which is idly mounted on a shaft and located between the two free-wheeling pinions, said runs passing in the same direction over both pinions, said free-wheeling pinions being mounted on said second shaft in such a way that when a control lever is driven downwards and pulls the chain, said chain rotates both free-wheeling pinions in opposite directions and the other control lever is driven upwardly by the chain passive run, the active run movement causing rotation of the second shaft during the lowering of the control lever which cooperates with the active run, the pinion rotating direction being reversed when the control lever which is connected to the passive run has reached the highest position thereof and begins to go down to drive the second shaft along that same direction it was driven along by the lowering of the other control lever, the pinion driving the bicycle driving wheel sprocket-wheel being driven by the second shaft rotation, a connecting part at each end of said chain for joining to said control levers, said part having a series of regularly spaced holes, each lever being also provided with a series of regularly spaced holes, removeable studs between said parts and levers in such manner that it is possible to change the place where the chain and the control levers are joined by moving the connecting parts relative to said levers.

* * * * *